United States Patent [19]

Scarrott et al.

[11] 4,262,783
[45] Apr. 21, 1981

[54] VEHICLE PROPULSION CONTROL SYSTEMS

[76] Inventors: Gordon G. Scarrott, 34 Pkwy., Welwyn Garden City, Hertfordshire; Michael J. Underwood, 4 Stanefield, Letchworth, Hertfordshire, both of England

[21] Appl. No.: 62,282

[22] Filed: Jul. 31, 1979

[51] Int. Cl.³ .............................................. B60K 41/28
[52] U.S. Cl. ...................................... 192/0.09; 74/866; 180/70 R; 192/4 A
[58] Field of Search ................... 192/0.033, 0.03, 0.09, 192/0.092, 0.094, 4 A; 180/70 R; 74/866

[56] References Cited

U.S. PATENT DOCUMENTS

| | | | |
|---|---|---|---|
| 3,834,499 | 9/1974 | Candellero et al. | 192/0.09 |
| 4,039,061 | 8/1977 | Pruvot et al. | 192/4 A |
| 4,157,124 | 6/1979 | Poore | 180/70 R |

Primary Examiner—George H. Krizmanich
Attorney, Agent, or Firm—Hane, Roberts, Spiecens & Cohen

[57] ABSTRACT

A vehicle propulsion system is proposed in which a computer carried aboard the vehicle has inputs from transducers indicating, as well as engine speed, extent of operation of the accelerator pedal and road speed of the vehicle, the extent of operation of the brake control, and has outputs connected to transducers to control throttle, gear selection and also to the braking system of the vehicle. This arrangement allows, during normal driving, the relief of drag when the vehicle is moving faster than the accelerator setting appears to demand by the modification of gear selection either to a very high ratio or to put the gearbox into neutral. It also, by the provision of the transducer associated with the braking system, permits the modification of braking effort resulting from pressure on the brake pedal to take into account a braking effort derived from the engine.

5 Claims, 2 Drawing Figures

VEHICLE PROPULSION CONTROL SYSTEMS

BACKGROUND OF THE INVENTION

The present invention relates to vehicle propulsion control systems and in particular to systems for the automatic control of the propulsion of vehicles driven by an engine connected through a gearbox to the driving wheels.

Propulsion control systems are well known in which manual gear changing is eliminated by the use of an automatic gear box incorporating a hydraulic torque converter, in which gear ratios are selected by reference to the road speed of the vehicle and the extent of depression of the accelerator pedal, so that the effective gear ratio is largely selected on the basis of the load on the engine. Gear boxes have also been proposed providing continuously variable ratios instead of discretely selectable ratios. Such systems are usually essentially mechanical in nature; and on account of losses in the torque converter, they require an increase in fuel consumption typically of the order of 5% over a normally driven manually controlled vehicle. It has also been proposed to employ an electronic data processing arrangement for similar control purposes incorporating stored data tables to specify appropriate gear ratios by reference to road speed and throttle position factors. To facilitate the selection of gear ratios in this way it is usual to employ a so-called automatic gearbox in which a number of predetermined gear ratios are provided by sun and planet gear configurations, the selection of a particular one of these ratios being accomplished by the application of a brake to the appropriate configuration. Such brakes are usually controlled by electrically tripped hydraulic selectors.

Whereas in the case of a manually controlled vehicle the driver usually has pedals to control the throttle (the accelerator pedal), the brakes and the clutch, the systems outlined above frequently require only two pedals, accelerator and brake, the clutch being automatically engaged when the accelerator pedal is depressed. A variety of automatic clutches have been proposed for this purpose, some relying on mechanical principles and others on electro-magnetic phenomena for their operation. However, in the previously proposed systems, the application of the automatic control arrangement is confined to provision of means for the generation only of positive thrust to drive the vehicle. Thus, braking, which arises as a consequence of the driver's demand for negative thrust, is directly under the control of the driver and is not communicated to the control system. Hence, such a control system has no means for assessing the driver's desire for negative thrust and consequently incurs avoidable losses by applying engine braking when zero positive thrust is requested unaccompanied by a demand for negative thrust.

Thus, there is, inherent in the control systems so far reviewed, a measure of uncertainty in the control input in distinguishing between the cessation of positive thrust requirements and an explicit demand on the part of the driver for generation of a negative thrust requirement. It is an object of the present invention, therefore, to provide an efficient control system able to distinguish between these three conditions, namely, positive thrust, negative thrust and neither, and also to arrange the system to generate negative, as well as positive thrust.

SUMMARY OF THE INVENTION

According to the invention, a vehicle propulsion control system for a vehicle having an engine connectable through a gearbox to at least one road wheel includes means to control the rate of supply of fuel to the engine; an accelerator control operable by a driver to indicate a required driving thrust; a braking system having a first control operable by the driver and a further control; and a computer having inputs and outputs, the inputs being connected at least to input transducers on the vehicle respectively arranged to provide current indications of engine speed, extent of operation of the first braking control, extent of operation of the accelerator control and road speed of the vehicle; the outputs being connected to output transducers on the vehicle respectively arranged to actuate the fuel supply means, to actuate means for selecting gear ratios, including neutral, at the gearbox and to actuate said further control of the braking system to modify braking forces applied to wheels of the vehicle; the computer being responsive to the indications to actuate the output transducing means.

Features of drag reduction by selecting high gear or neutral, and control of braking effort taken separately represent significant advantages over previously known systems.

BRIEF DESCRIPTION OF DRAWINGS

An embodiment of the invention will now be described, by way of example, with reference to the accompanying drawings, in which.

DESCRIPTION OF PREFERRED EMBODIMENT

Figure 1:
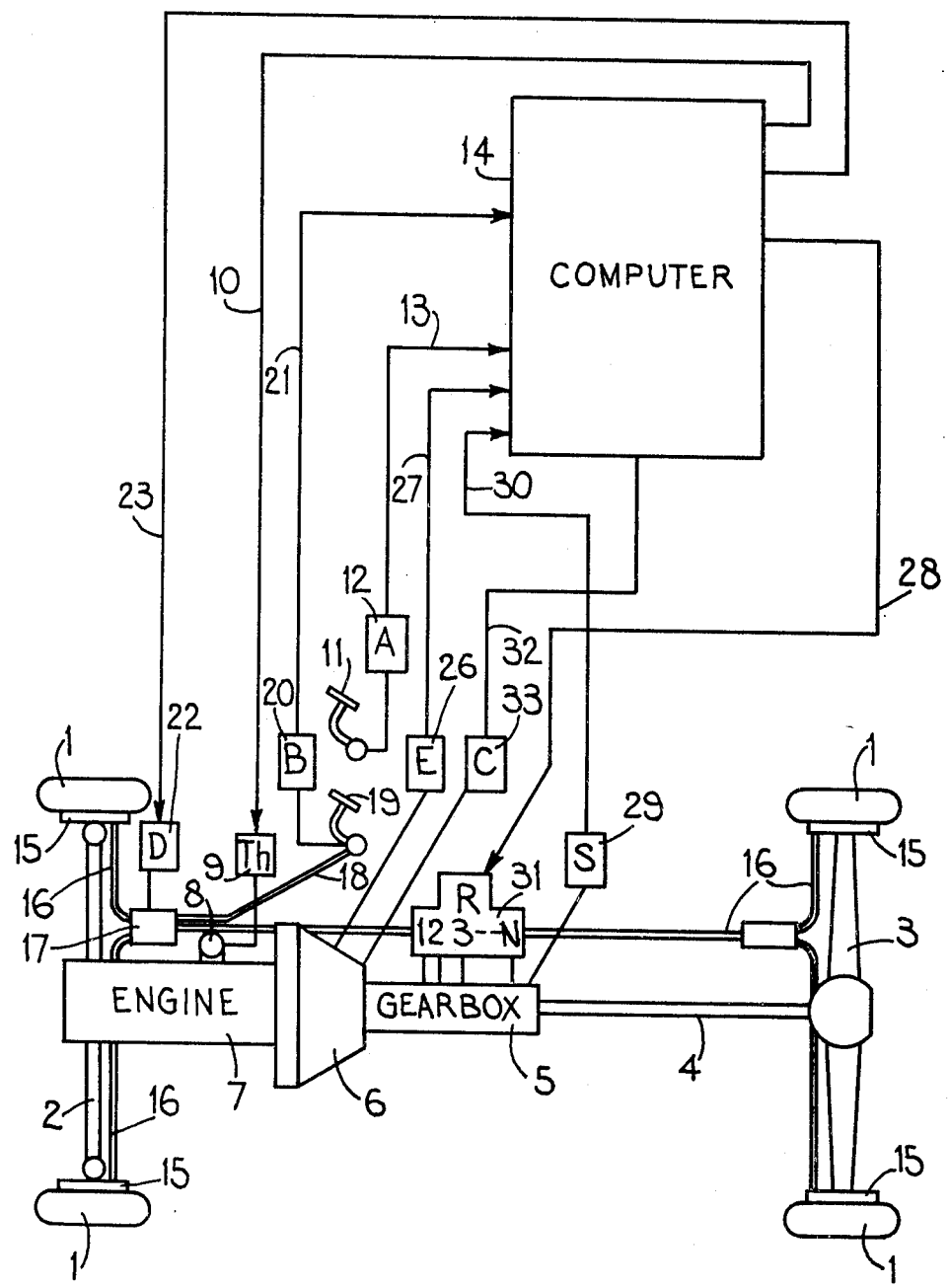
FIG. 1 shows diagrammatically an arrangement of transducers and a computer relative to a motor vehicle.

FIG. 1 is a schematic representation of a road vehicle from which parts unnecessary to an understanding of the invention are omitted for the sake of clarity. The vehicle is supported on road wheels 1 arranged in pairs. Typically one pair of wheels 1 are steerable and are mounted on an axle 2, the steering mechanism not being shown in the Figure. The second pair of wheels 1 are arranged to transmit drive and are associated with conventional driving shafts (not shown) housed in a casing 3 which also contains a differential gear (not shown) coupled to a propeller shaft 4. The propeller shaft 4 is coupled to an output end of a gearbox 5, whose input is driven through a clutch contained within a clutch housing 6 by an engine 7. The engine is, in this example, a petroleum fuelled internal combustion engine of well-known form and incorporates a carburetter 8 forming a fuel regulating device to control the admission of fuel to the engine 7, the actual regulation of the fuel being performed by a throttle valve (not shown) within the carburetter 8. A transducer 9 is linked to the throttle valve and is responsive to signals, Th, on a line 10 to control its opening. In the conventional engine control arrangement, accelerator pedal 11 is provided and is directly linked to the throttle valve. In the present example, however the accelerator pedal 11 is coupled to a transducer 12 which provides a signal, A, over a line 13 representing the extent of depression of the pedal 11. The lines 10 and 13 are connected to a computer 14, the line 13 being an input line to the computer 14 and the line 10 being an output line therefrom.

Each of the wheels 1 is equipped with a brake 15, the brakes 15 being hydraulically operated by fluid pressure transmitted over lines 16 from a brake cylinder 17. The cylinder 17 includes an operating mechanism (not shown) coupled by a linkage 18 to a brake pedal 19. A transducer 20 is also coupled to the brake pedal 19 and provides a signal, B, representative of the force applied to the brake pedal 19, over a line 21 to another input of computer 14. An output line 23 is provided from the computer 14 to apply a signal, F, to a transducer 22 coupled to the brake cylinder 17 to modify its operation in order to vary, to a limited extent, the braking force D applied to the wheel brakes 15.

Yet another transducer 26 is provided in association with the engine 7 to produce a signal, E, on input line 27 to the computer 14, the signal E representing the current speed of the engine output shaft (not shown). The engine output shaft is coupled through the clutch (not shown) enclosed in housing 6 to the gearbox 5, which has a group of transducers 31 arranged to select a particular gear ratios (R1,R2 ... N) within the gearbox 5. These transducers are connected as outputs to the computer 14 over a cable generally shown at 28. A further transducer 29 is connected to the output drive of the gearbox 5 and is arranged to provide a signal, S, over input line 30 to the computer 14, the signal S representing the current road speed of the vehicle. It is to be understood that these transducers would be modified in the case of a vehicle equipped with a continuously variable ratio gear box.

For the sake of the present example, it is assumed that the clutch is automatically engaged as in the case of the well-known automatic transmission arrangement, and in this case a transducer 33 provides a signal C over a line 32 to indicate that the clutch is engaged. It will be appreciated that for other clutch arrangements the computer will be arranged to provide a clutch-energising signal and in this case the transducer 33 would be responsive to the signal C on line 32 to initiate engagement of the clutch.

Figure 2:
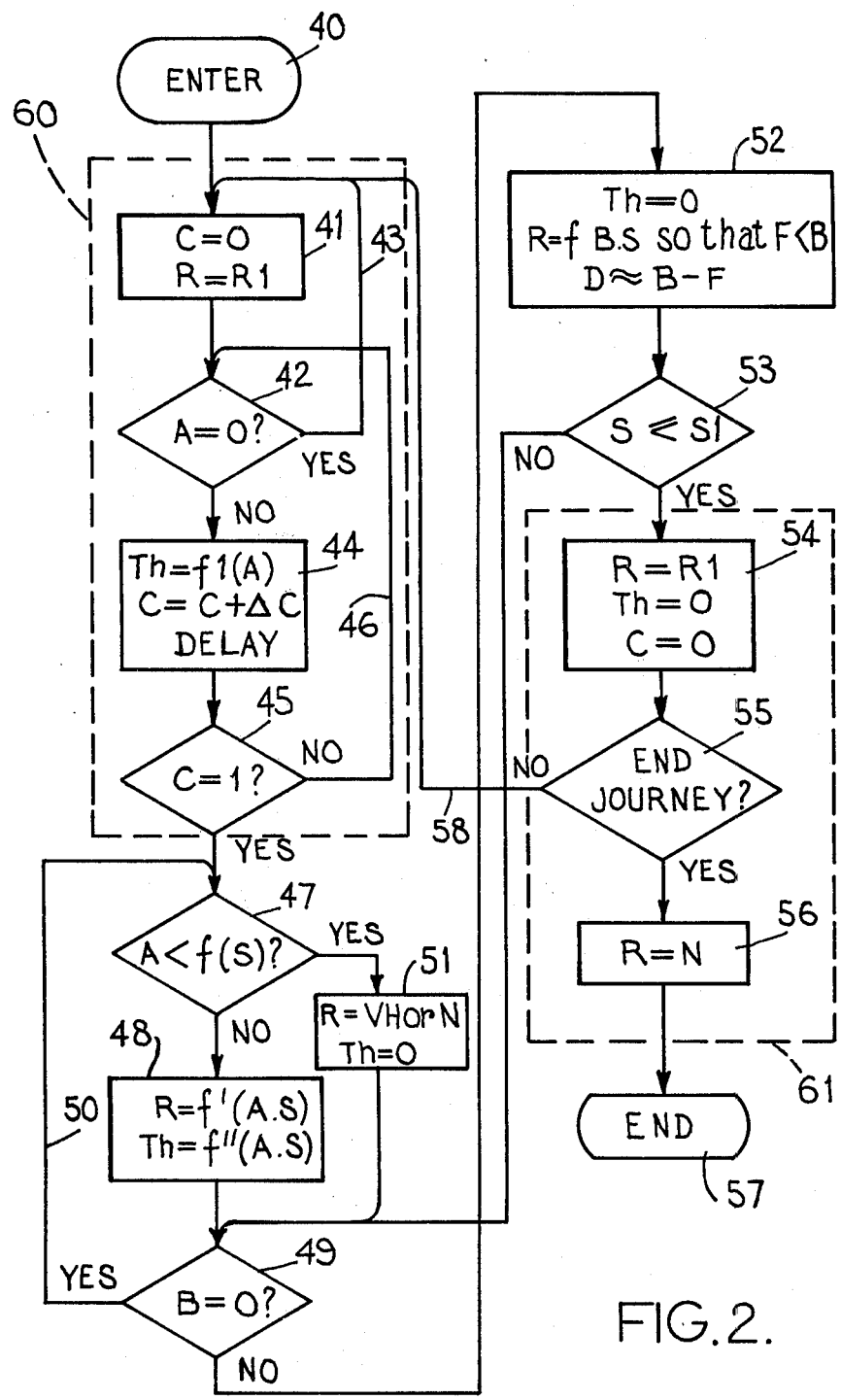
FIG. 2 is a flow chart illustrating the operation of the vehicle under different driving conditions.

The computer 14 is typically a conventional microprocessor and is arranged to provide output signals for the energisation of the output transducers 9, 22 and 31, the actual output signals being derived in the conventional manner from driving circuits (not shown) which produce the necessary high current signals in response to the computer outputs. FIG. 2 shows in the form of a flow chart the interactions of the various input and output connections from the computer in controlling the drive conditions applied to the vehicle. It will be seen that the flow chart comprises three distinct phases of operation, namely a starting routine, enclosed by a dashed outline 60; a normal drive routine, and a stopping routine, enclosed by a dashed outline 61. The conditions required for the starting and stopping routines 60, 61 are clearly dependent upon the precise nature of the vehicular equipment, and in the following description it is assumed that an automatic transmission is provided, having a selector with "Drive", "Reverse", "Neutral" and "Park" positions. Interacting factors, e.g. A,B,C,D,TH,F are normalised to have values between 0 and 1.

With the transmission selector positioned at Neutral, the engine is started and the starting routine is then initiated by the driver selecting either the Drive or Reverse positions, the computer circuits being reset at this point. It will be assumed that in the present case, the selector is moved to the Drive position and the cycle is entered at box 40 in FIG. 2. As indicated at box 41, the clutch at this point is disengaged (C=0) and a gear ratio is selected in dependence upon the position of the transmission selector. In this case, because Drive has been chosen, the lowest forward gear ratio is selected (R=R1) by an appropriate one of the transducers 31. A comparison evaluation represented by box 42 is now performed, in which the current accelerator pedal position (A), represented by the input signal from the accelerator pedal transducer 12 (FIG. 1), is examined. While the pedal remains undepressed a zero condition exists in which the condition A=0 is true, represented by the "YES" line 43 (FIG. 2) from the box 41, with the result that the computer repeatedly recycles the comparison operation. As soon as the accelerator pedal 11 is depressed, the transducer 12 produces a signal, A, and the comparison A=0 becomes false. Thereupon the routine proceeds to a further stage, represented by box 44.

In this stage, the throttle is initially set to a first function of the accelerator pedal position Th=f1(A) in response to a signal on line 10 to transducer 9 and the clutch will be partially engaged (C=C+$\Delta$C). The routine then pauses for a very short delay, after which the engagement of the clutch is monitored as indicated by box 45, and as long as it is not fully engaged (C=1) then the starting routine is recycled over line 46. On each cycle, provided that A is not equal to zero (A$\neq$0?), the clutch engagement is advanced by a further increment, the cycles being repeated until the clutch is fully engaged (C=1). At this point the starting routine is completed, the condition of box 45 being satisfied, and the operation enters the normal drive routine at box 47. It will be realised that since the starting routine is merely to engage the clutch to initiate movement of the vehicle, other forms of starting routine may be employed, particularly when, for example, manual engagement of clutch and selection of low gear ratio is contemplated.

The box 47 represents a threshold condition, in which the depression of the accelerator pedal is less than a predetermined function of the road speed, A<f(S); which is required to be fulfilled during driving, for the initiation of a "minimum-drag" condition, and it is assumed at this point that it is not applicable, so that the "NO" line from this box extends the operation to box 48.

Box 48 represents the normal driving control exercised by the computer in the selection of gear ratio and throttle opening. Thus, the computer continually monitors the inputs A (accelerator pedal depression), E (engine speed) and S (road speed) to select a gear ratio R as a first function, f', of A and S and to control the throttle opening Th as a second function, f'', of these two factors, and this control is maintained for as long as the brake pedal remains undepressed, as indicated by box 49 (B=0?). As long as this condition is true the operation is constantly recycled, as indicated by line 50.

While the accelerator pedal is used to control the progress of the vehicle and remains depressed beyond the point represented in the box 47, i.e. A<f(S), to avoid the engine being used grossly inefficiently, then the driving routine continually cycles through the boxes 47, 48 and 49. However, if, during this routine, the driver releases the throttle to a point where the box 47 condition becomes true a requirement exists for the vehicle's progress to be unimpeded by a drag factor from the engine and a "minimum-drag" option is selected, as represented by box 51. In this case the gearbox is reselected according to its inbuilt capability either to select a very high ratio with the throttle closed (Th=0), or to be put into neutral (R=VH or N), the choice of this gear box selection also depending, for example, on such factors as a drivers prejudice, or of a legal prohibition on free-wheeling, or coasting, despite the pre-supposition that efficient braking is a pre-requisite to this mode of control.

The driving routine continues to cycle over the line 50, however, until depression of the brake pedal renders the condition B=0, of box 49, false, and at this point a normal driving routine for braking is entered at box 52. In this routine, the throttle is closed, i.e. Th=0, and this action produces a braking force F from the engine, the value F being computed and the effective force being dependent upon the gear ratio which is selected. The ratio selection is made as a function of B and S to make F less than B (which is the pressure in the braking system resulting from the force exerted by the driver on the brake pedal) and becomes (R=f(B.S) so that F<B), and the brake system pressure resulting in a brake-shoe force D is then made approximately equal to B−F, so that the actual brake shoe force is approximately equal to the braking effect demanded by the brake pedal position less the braking force produced by the engine.

Thus, the total braking force is approximately the value which the driver would have expected from the force he applied to the brake pedal. It will be realised that this feature represents a considerable technical advance over previously proposed systems and results in a considerable increase in the efficiency of control attainable by the use of the computer.

The application of braking to the driving routine is dependent upon the depression of the brake pedal and it will be realised that braking may be required for two purposes; to slow the speed of the vehicle temporarily, as under normal driving conditions, or to stop it. The continued cycling of the braking routine is therefore made dependent upon a further comparison operation, indicated by box 53. A premise is assumed that if the road speed falls below a predetermined speed, $S_1$, then it is the driver's intention to stop. Entry into the stopping routine is based on this premise. Thus, the actual road speed S is compared with the predetermined speed $S_1$ and while the road speed S is the greater, the braking routine for normal driving continues to be cycled for as long as the brake pedal is depressed. At the end of a temporary slowing operation, if the road speed has not fallen to the predetermined speed $S_1$, the release of the brake pedal allows the normal drive routine to be continued at boxes 53 and 49, and over line 50. If, however, the road speed equals or falls below the speed $S_1$, the operation continues as the stop routine 61, entered at box 54. During this part of the operation, the braking effect is made dependent upon the driver's control of the brake pedal. The lowest gear ratio is selected (R=R1), the throttle remains closed (Th=0) and the clutch becomes disengaged (C=0) as the vehicle is brought to rest.

Once the vehicle is stationary, the continuance of the operation will depend upon whether the stop represents the end of a journey or a temporary halt. If the journey is at an end, then termination of operation is signified by the driver moving the transmission selector to the Neutral position, indicated at box 55. This action causes the gear ratio selection to be reset so that the gear box is put into neutral (R=N), as indicated at box 55, and the operational cycle is terminated (box 57). On the other hand, if the stop is merely temporary, it will be appreciated that this condition corresponds to that obtaining at the commencement of the operation and accordingly the operational cycle is returned over line 58 to the start routine at box 41.

In carrying out the operational routines described above, it will be appreciated that the control elements of the computer 14 (FIG. 1) are arranged to minimise fuel consumption and also to minimise brake wear so that efficient braking is available in case of emergency. Thus, the inputs representing engine speed and road speed together with the current throttle setting in relation to the accelerator pedal position allow the optimisation of engine operating conditions and the selection of a new gear ratio is then made independently of the consideration of whether the new ratio is or is not immediately adjacent to the ratio currently in use. Hence, in the driving routine the gear ratio is changed to provide the driving thrust defined by A at the lowest engine speed and the adjustment of Th secures the requisite fine control of engine torque. Where A indicates maximum pedal displacement, the ratio selected is that which permits the engine to deliver full available power at the current value of S. It will be realised that the parameters used for programming the computer will depend upon the characteristics of the vehicle and its various components. These will include, for example, the available gear ratios, in the case of a selectable discrete ratio gear box, the power and fuel consumption characterics of the particular engine at various speeds. However, since the evaluation of the required outputs from the computer comprise essentially comparison and mathematical operations it is clear that the programming of the computer is within the capabilities of one skilled in the programming art from the flow-chart illustrated.

Thus the present invention is enabled to improve the efficiency of the performance of the vehicle primarily by the provision, in addition to the transducers used for gear selection and throttle control, of the additional transducers 20 and 22 concerned with the provision of braking effort applied by the driver and the modification where appropriate of the effective pressure to be applied to the braking system together with the "minimum-drag" condition during a free-running driving phase when the driver's braking input is zero.

It also follows that, during the driving routine, because the braking effect of the engine is a factor taken into account when computing the actual brake force D to be applied to the brakes themselves it will be realised that excessive braking effort is avoided, so that brake wear is minimised.

It will be realised that the proposed arrangement requires a greater number of transducers than previous systems. However, the individual transducers themselves may be selected from a variety of known kinds. Where the gear box is able only to select discrete ratios, it is desirable to provide a somewhat greater number of such discrete ratio combinations than have previously been used, but it is submitted that no new principles of operation of the gear selection mechanism are involved. The particular form of program required for operation of the computer will depend upon the particular computer used, and the computer may be digital or analogue in operating principle. However, as previously noted, it is thought that the generation of a suitable program to fulfil the requirements set out above is readily accomplished by one skilled in the art of the computer chosen.

In addition to the operations constituting the driving routine set out above, a further economy may be achieved, when a cruising condition at a substantially constant speed is detected, for example by storing the current value of S and comparing this value with a later value for S under control of a time delay circuit, the later value then being stored in its turn. Under such cruising conditions the throttle and gear ratio selection outputs 9 and 31 (FIG. 1) may be operated alternately on a mark-space basis, first to run the engine at full throttle with a high gear ratio selected and then to close the throttle and select neutral. As an extension to these features, it is also possible to provide, stored within the computer, the maximum allowable speeds set by legal speed limitations so that the driver may select the appropriate limit, where applicable, and the road speed S is then controllable by the setting of the R and Th outputs so that the selected limit is automatically observed.

It will be appreciated that it is also possible to reduce the fuel consumption of the engine when it is being used to provide negative thrust. Thus, for example, in the case of a fuel-injection system, the fuel supply may be cut off.

The foregoing description has not dealt in detail with the selection of reverse gear, but it is readily appreciated that the selection of this gear requirement in the starting procedure would be similar to that for the selection of the lowest forward gear for the engagement of the clutch. The driving routine in this case would not be required, since reversal is normally an infrequently required low-speed manoeuvre.

Moreover, the description has assumed, for simplicity of description, an automatic clutch. However, it will be realised that a clutch operated by the driver may alternatively be used, although in this case the starting routine 60 would be modified to receive information on the clutch pedal operation in assessing the degree of clutch engagement. It will be realised that this form of operation is less desirable than that described.

Although a rear-wheel drive petroleum fuelled vehicle is illustrated as an example, it will be realised that the operational cycle described is applicable to any controllable-speed engined vehicle with a suitable variable gear drive connection. It is also to be understood that while the principal transducers and control lines connected to the computer are illustrated in FIG. 1, the computer may also require the provision of additional lines for the purpose of monitoring the operation of the various components. As a typical example, the gear box would preferably be provided with such monitor lines so that, for example, if the computer has required engagement of a particular gear ratio, then the monitor line associated with that ratio would be scanned to make sure that the required operation has been carried out. This permits the generation of a warning in the event of malfunction in the system.

I claim:

1. A vehicle propulsion control system for a wheeled vehicle having an engine connectable through a gearbox to at least one road wheel including means to control the rate of supply of fuel to the engine; an accelerator control operable by a driver to indicate a required driving thrust; a braking system having a first control operable by the driver and a further control; and a computer having inputs and outputs, the inputs being connected at least to input transducers on the vehicle respectively arranged to provide current indications of engine speed, extent of operation of the first braking control, extent of operation of the accelerator control and road speed of the vehicle; the outputs being connected to output transducers on the vehicle respectively arranged to actuate the fuel supply means, to actuate means for selecting gear ratios, including neutral, at the gearbox and to actuate said further control of the braking system to modify braking forces applied to wheels of the vehicle; the computer being responsive to the indications to actuate the output transducing means.

2. A system as claimed in 1 in which in response to input indications of the extent of operation of the accelerator and of road speed such that a predetermined function of indicated road speed exceeds that extent of operation of the accelerator required directly to produce such speed, the control system modifies the propulsion arrangement into a minimum-drag phase of operation.

3. A system as claimed in claim 2 in which in response to the minimum-drag phase, an output transducer associated with the gearbox is actuated to select a very high gear ratio.

4. A system as claimed in claim 2 in which in response to the minimum-drag phase, an output transducer associated with the gearbox is actuated to select neutral.

5. A system as claimed in claim 2 in which in response to an indication of operation of said first braking control concurrently with an indication that the accelerator control is un-operated, the propulsion arrangement is modified into a normal braking phase of operation in which the output transducer associated with said further control of the braking system is actuated to produce an effective braking pressure acting on wheels of the vehicle less than that produced by said first control by a factor representing a braking force derived from the engine of the vehicle.

* * * * *